United States Patent [19]
Adari et al.

[11] Patent Number: 5,353,327
[45] Date of Patent: Oct. 4, 1994

[54] MAINTENANCE TERMINATION UNIT

[75] Inventors: Seva nanda Adari, Red Bank; Marilyn C. Chiang, Manalapan; Anthony M. DeSanto, Somerville; R. Earl Fenley, Jr., Point Pleasant; Anand K. Javvaji; Ramadevi Sreedhara, both of Iselin, all of N.J.

[73] Assignee: AT&T Bell Laboratories, Murray Hill, N.J.

[21] Appl. No.: 878,376

[22] Filed: May 4, 1992

[51] Int. Cl.$^5$ ............................................. H04M 1/24
[52] U.S. Cl. ..................................... 379/22; 379/24; 379/25; 379/26; 379/27; 379/29
[58] Field of Search ................... 379/2, 26, 27, 29, 22, 379/5, 6, 19, 31, 24, 25

[56] References Cited

U.S. PATENT DOCUMENTS

| | | | |
|---|---|---|---|
| 3,916,381 | 10/1975 | Johnson, III et al. | 379/29 X |
| 4,488,011 | 12/1984 | Rogers . | |
| 4,614,844 | 9/1986 | Leeper . | |
| 4,620,070 | 10/1986 | Ruehl . | |
| 4,670,898 | 6/1987 | Pierce et al. | 379/29 X |
| 4,827,498 | 5/1989 | Ross . | |
| 4,841,560 | 6/1989 | Chan et al. | 379/29 |
| 4,843,620 | 6/1989 | Hagedorn | 379/26 X |
| 4,879,739 | 11/1989 | Forson . | |
| 4,991,105 | 2/1991 | Pimental | 379/36 X |
| 5,073,919 | 12/1991 | Hagensick | 379/29 |

OTHER PUBLICATIONS

Bellcore Technical Reference TR-TSY-000324, Issue 1, Dec. 1988, "Maintenance Termination Unit: Generic Requirements for Application on Single-Party Loop-Start Lines".

Primary Examiner—Stephen Chin
Assistant Examiner—Paul Loomis
Attorney, Agent, or Firm—Barry H. Freedman

[57] ABSTRACT

An "intelligent" maintenance termination unit (MTU) that can be installed at or near the demarcation point between the telecommunications network and Customer Premises Equipment (CPE), includes a program controlled processor arranged to perform numerous testing and evaluation functions on (1) the CPE and the drop portion of the telecommunications circuit located on the customer side of the MTU, as well as (2) the line portion of the telecommunications circuit on the network side of the MTU. Testing may be initiated in response to actuation of a pushbutton switch or other initiation means by the customer. Specific tests are then performed in response to receipt of signal sequences (such as Touch-Tone signals) received from a technician at a remote test center. The MTU advantageously includes audio input (microphone) and output (speaker) units, preferably in the form of a speakerphone set, enabling the technician to be placed in direct audio communication, in real time, with the customer when the MTU is actuated. The MTU is transparent to normal line operation, i.e., ringing, dialing and routine maintenance otherwise performed from the central office or by the CPE.

26 Claims, 8 Drawing Sheets

MAINTENANCE TERMINATION UNIT

FIELD OF THE INVENTION

This invention relates generally to telecommunications line and equipment testing apparatus and a process for using the same, and, in particular, to an intelligent Maintenance Termination Unit (MTU) that can be installed in a modular jack or other coupler (via screw terminals) located near the demarcation point between the telecommunications network and Customer Premises Equipment (CPE). When the MTU is activated, it can be used to identify and isolate troubles that may occur in either the network/line or the customer's drop and CPE.

BACKGROUND OF THE INVENTION

Before the break-up of the Bell System in the early 1980's, telecommunications line and equipment testing was relatively easy, because a single entity was usually responsible for providing end-to-end service to telephone customers. After the break-up, the situation changed: it became necessary to isolate the source of the problem in order to identify the entity responsible for repairing "troubles" in a customer's telecommunications service. This is true because several entities are now responsible for providing individual portions of the end-to-end service that was previously supplied by a single carrier. In particular, Customer Premises Equipment (CPE) such as station equipment and private branch exchanges (PBX's) are now usually the customer's responsibility. The local loop between CPE and the Central Office is typically the responsibility of the Local Exchange Carrier (LEC), while long distance facilities are usually the responsibility of an Interexchange Carrier (IXC) such as AT&T.

The process of isolating a problem arising in CPE as opposed to in the network (or vice versa), often involved dispatching a craftsperson or technician to the customer's premises with test equipment that could be plugged into the line and locally activated, so as to isolate the defect as either on the network side or the CPE side. See, for example, U.S. Pat. No. 4879739, entitled Wiring Test Device and Method, issued Nov. 7, 1989 to Henry M. Forson, which describes test equipment having two parts: a battery powered, hand-held signal generator adapted to be connected to a home or business telephone line at the interface between the telephone company wiring and the home or business wiring, and a hand-held receiver adapted to be plugged into each modular telephone jack of the home or business line. The signal generator successively applies a uniquely coded pulsed signal to each wire of the line, and monitors the results obtained, in order to isolate the problem to either the home/business line or CPE, on the one hand, or the telephone company line, on the other hand. A visual indicator such as an LED in the receiver indicates reception of the applied test signals. Reception of the wrong signal on a given line indicates a possible cross connection; reception of the same signal on more than one line indicates a short between the lines, and failure to receive any signal on a line indicates an open (break).

The Forson approach was complicated, because two pieces of apparatus were involved in the testing procedure, and inefficient, because testing still had to be done locally, by a craftsperson or technician, at the customer premises. These difficulties were somewhat alleviated in other arrangements, which provide a remotely actuatable testing capability directly at a Maintenance Termination Unit (MTU) typically provided in a jack located at the demarcation point between the telecommunications network and Customer Premises Equipment (CPE). A performance specification for one implementation of an MTU is contained in Bellcore Technical Reference TR-TSY-000324, Issue 1, dated December 1988. Several patents describe MTU-like apparatus for testing telephone lines including: U.S. Pat. No. 4827498, entitled Telephone Line and Instrument Tester, issued May 2, 1989 to James W. Ross; U.S. Pat. No. 4620070, entitled Telephone Line Tester, issued Nov. 28, 1986 to William E. Ruehl; U.S. Pat. No. 4614844, entitled Telephone Service Checking Terminal, issued Sep. 30, 1986 to Budd E. Leeper; and U.S. Pat. No. 4488011, entitled On-Premise Telephone Test Jack, issued Dec. 11, 1984 to M. Mattrice Rogers.

Despite the advances in the design of MTU's, it has nevertheless remained difficult to efficiently identify and isolate troubles that may occur in either the network or the customer's drop and CPE. Some difficulties are associated with the difficulty in using presently available MTU's and similar equipment. Other difficulties are associated with a lack of functionality in such devices.

SUMMARY OF THE INVENTION

In accordance with the present invention, an intelligent Maintenance Termination Unit (MTU) that can be installed in a modular jack or other coupler (using screw terminals) located near the demarcation point between the telecommunications network and Customer Premises Equipment (CPE), includes a program controlled processor arranged to perform numerous testing and evaluation functions on (1) the CPE and the portion of the telecommunications line located on the customer side of the jack, as well as (2) the loop portion of the telecommunications line on the network side of the jack. Testing may be initiated in response to actuation of a pushbutton switch (or similar means) by the customer. Specific tests are then performed in response to receipt of signal sequences (such as Touch-Tone multi-frequency signals) received from a technician at a remote location. In accordance with the invention, the MTU advantageously includes audio input (microphone) and output (speaker) units, preferably in the form of a speakerphone set, (without a Touch-Tone pad) enabling the craftsperson or technician performing remote testing to be placed in direct communication, in real time, with the customer when the MTU is activated. The MTU is transparent to normal line operation, i.e., ringing, dialing and routine maintenance otherwise performed from the Central Office or by the CPE.

BRIEF DESCRIPTION OF THE DRAWINGS

The present invention will be fully understood from the following detailed description, which should be read in light of the accompanying drawing, in which.

DETAILED DESCRIPTION

Figure 1:
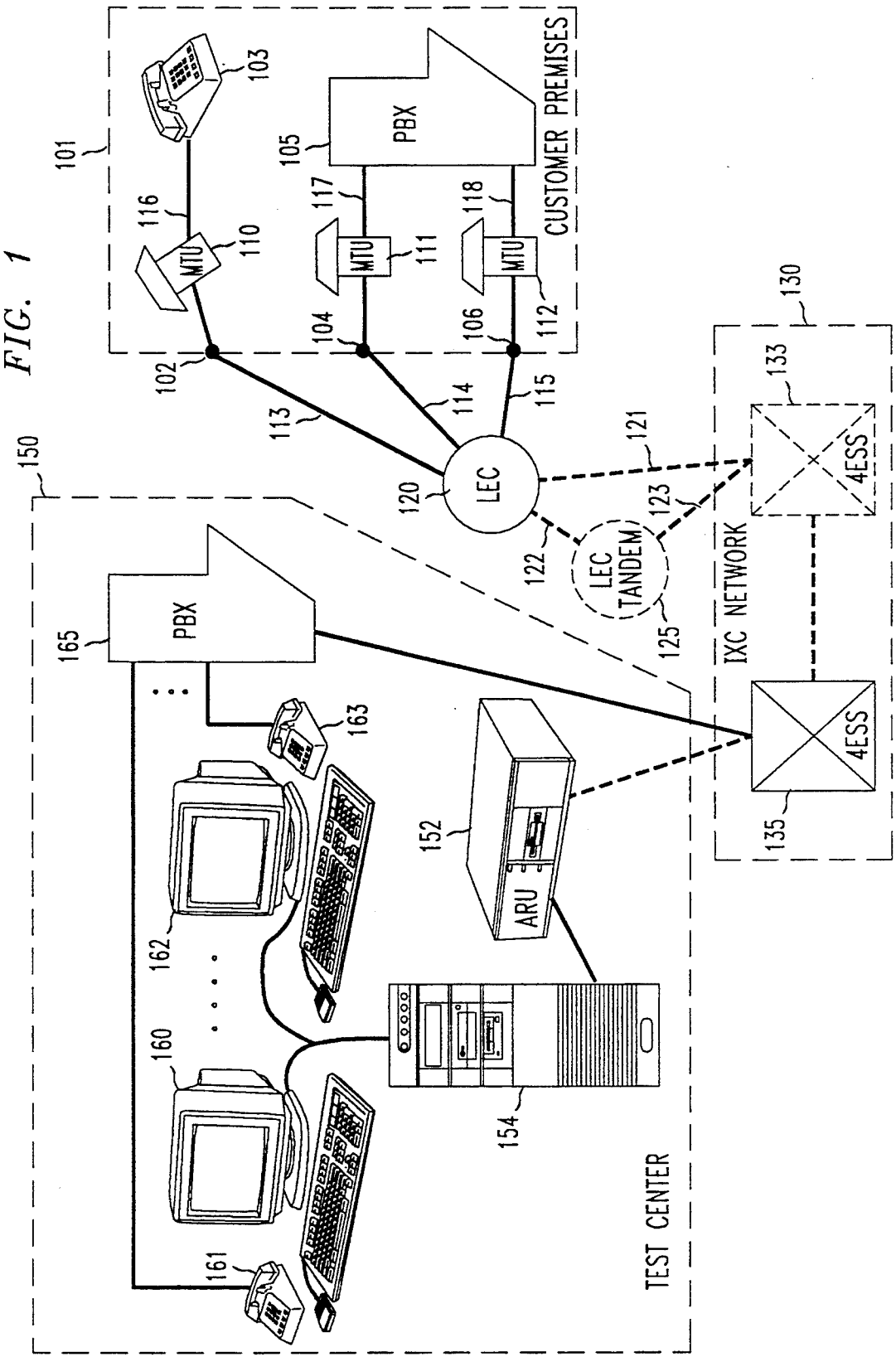
FIG. 1 is a block diagram illustrating the positioning of intelligent MTU's contemplated by the present invention, in relation to CPE and the remainder of the telecommunications network.

FIG. 1 illustrates the positioning of several intelligent MTUs 110–112 contemplated by the present invention, in relation to CPE and the remainder of the telecommunications network. It also illustrates one possible configuration for a test center 150 that can be used by craftspersons or technicians in remotely accessing MTU's 110–112 and using them to isolate and identify the location of troubles reported by a customer.

In FIG. 1, customer premises 101 illustratively includes two "pieces" of CPE, namely a telephone 103 and a PBX 105, both of which are connected to a switch in a LEC office 120. In each of the telecommunications lines that connect the CPE to LEC office 120, a separate MTU (in accordance with the present invention) is positioned at the "point of demarcation" that separates the network portion of the line from the customer portion of the line, or, as shown in FIG. 1, on the CPE side near the point of demarcation. Specifically, in FIG. 1, MTU 110 is located on the CPE side of demarcation point 102. A portion of the 116 drop connects MTU 110 to telephone 103. The network line 113 and a small portion of the drop connects MTU 110 to LEC office 120. Likewise, MTU's 111, 112 are located at or near demarcation points 104, 106, respectively, essentially connecting drop portions 117, 118 (between MTU's 111, 112 and PBX 105, respectively) and network line portions 114, 115 (between MTU's 111, 112 and LEC office 120, respectively). Other CPE, such as facsimile machines, modems, etc., not shown, may be connected to LEC office 120 via other lines that are serviced by other MTU's; however, it is to be noted that an MTU need not be installed on every line. Rather, only those lines that are critical, or that are prone to trouble, or that meet other customer defined criteria, may be so equipped.

Switches in LEC office 120 are interconnected with switches in an Inter-exchange Carrier (IXC) network 130 either directly, via trunk 121, or via a LEC tandem office 125 and interconnecting trunks 122, 123. IXC network 130 includes a plurality of interconnected switches, such as switches 133 and 135, one of which is shown in FIG. 1 as being also connected to a maintenance and testing facility designated generally as test center 150. Craftspersons or technicians at this test center utilize MTU's 110–112 in cooperation with the customer at customer premises 101 to isolate and diagnose troubles reported in CPE such as telephone 103 and PBX 105.

When a malfunction is detected in CPE in customer premises 101, a call to request assistance is initiated (from a working telephone) to a preselected number associated with test center 150, which includes one or more workstations 160, 162 used by the technicians. The call may be routed to test center 150 via LEC switch 120 and IXC network 130, or via any other available route. When the technician receives the call requesting assistance, he/she may utilize a server 154 connected to his/her workstation in order to look up and retrieve stored data useful in interacting with the customer. This data includes, for example, information identifying the customer's CPE and respective lines, and indicating if there is an MTU available on the affected line that can be used to perform testing and isolate the problem. The technician now utilizes an audio response unit (ARU) 152 connected to server 154 to initiate a first call to himself or herself through PBX 165, and a second call back to the customer line (and associated MTU)on which trouble is being experienced. These calls are then bridged, such that the technician is put into communication with the MTU serving the customer via a path through ARU 152. This ARU may be a Conversant ® Voice Information System (CVIS) available from AT&T, or any other similar system arranged to perform functions described herein. At this point, the appropriate MTU (110, 111 or 112) may be used for testing. This is described in more detail below.

Figure 2:
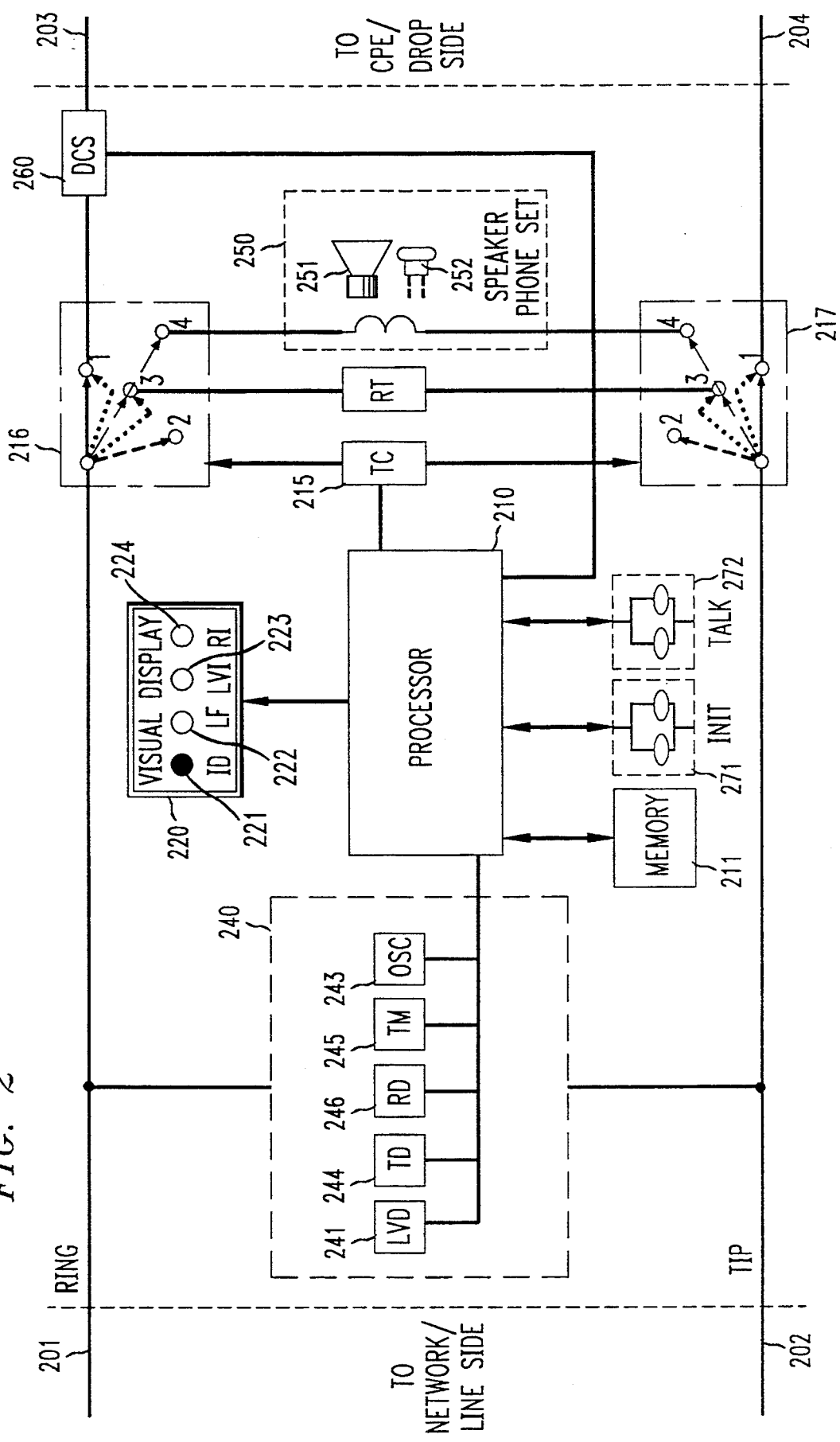
FIG. 2 is a block diagram of an intelligent Maintenance Termination Unit (MTU) arranged in accordance with the present invention.

FIG. 2 is a block diagram of an intelligent Maintenance Termination Unit (MTU) (such as MTU 110, 111 or 112 of FIG. 1) arranged in accordance with the present invention. Lines 201 and 202 connect the ring and tip leads, respectively, of the network line portion (e.g., 113, 114 or 115) of the telephone line to the MTU. These connections can be via screw terminals or a modular jack connection. Lines 203 and 204 connect the MTU to the associated CPE (for example, telephone 103 or PBX 105 of FIG. 1). These connections can also be via screw terminals or a standard modular telephone jack. The loop formed by lines 203 and 204 to telephone 103 may be either "Ground Start" or "Loop Start".

At the heart of the MTU of FIG. 2 is a processor 210, which operates under the control of stored programs in an associated memory 211. Briefly, processor 210 performs three major functions, each of which is discussed in more detail below. First, processor 210 provides control signals to a termination control circuit 215, which determines the position of two electromechanical switches 216, 217. These switches, in turn, determine the "operating stage" of the MTU. In stage 1, designated the "normal" stage, the MTU is idle and the CPE is connected to LEC office 120 via network line portion 113. In stage 2, the MTU is "on-hook" while the CPE is disconnected. In stages 3 and 4 the MTU is "off-hook" and the CPE is disconnected. The difference is that in stage 4, a speakerphone set 250, described below, is also active. In stage 5, a combination of stages 1 and 3 occurs: the CPE is connected and the MTU is off-hook.

The second function of processor 210 is to provide control signals to a visual display 220, which can include a liquid crystal display (LCD) so as to draw minimal current from the line. Visual display 220 allows the customer to check the presence of line voltage, ringing voltage, logic failure and initiation. Specifically, a first "Initiation Detect" indicator 221 is activated when the MTU is in a stage other than stages 1 and 2. A second "Logic Failure" indicator 222 is activated when the MTU's self-diagnosis reveals that it is not capable of operating as intended. A third "Line Voltage" indicator 223 is activated as long as there is power across lines 201, 202. A fourth "Ring" indicator 224 is activated when ringing voltage is detected by a ring detector 246 in the MTU. During ringing, indicator 224 turns on and off. This is done so that the customer may see an indication of tinging. Other indicators may be included in visual display 220, if desired.

The third function of processor 210 is to provide control signals to allow individual tests and measurements to be performed; the functionality for each of the tests and measurements is represented by an individual application block shown in an application module 240. In particular, when line voltage detector 241 is activated, the voltage across lines 201,202 can be measured. The following functions can also be activated: (1) an oscillator 243 can emit tones of a desired frequency, (2) a tone detector 244 can indicate the presence on lines 201,202 of tone signals of a various frequencies, (3) a tone measurement unit 245 can measure the signal power level of detected tones, and (4) ring detector 246 can respond to the presence of ringing voltage on lines 201,202.

As mentioned above, the MTU of FIG. 2 includes a speakerphone set 250 which comprises an output device (e.g., speaker) 251, an input device (e.g., microphone) 252, and other necessary circuit elements, such as a squelch circuit. These devices are used, among other things, to communicate between the technician and the customer after testing is initiated.

Also shown in FIG. 2 are INIT and TALK switches 271 and 272, which can be pushbutton devices. Alternatively, these switches can use any other suitable switch arrangement. INIT switch 271 is actuated by the customer to initiate the operation of the MTU, while TALK switch 272 is actuated to initiate the operation of speakerphone set 250. In addition, a drop current sensor 260 is included between line 201 and line 203. The purpose of drop current sensor 260 will be discussed below.

Before proceeding with an in-depth description of the operating stages and states of the MTU of FIG. 2, an overview will be helpful. After the customer has actuated INIT switch 271 to initiate the operation of the MTU, a large variety of functions can be performed upon receipt of commands from a technician in test center 150 using telephones 161,163 or workstations 160, 162. The commands can, for example, be in the form of specific signal sequences, which for convenience are described below as 3-digit Touch-Tone patterns that are generated by the technician using telephone 161 or 163 or ARU 152. In the latter case, the ARU is provided with an appropriate multifrequency tone generation capability. Signal sequences can also be received from any other source that makes a call via network line portion 113 to the MTU. In response to the signal sequences, the MTU can be remotely controlled as follows:

1. The MTU can transmit a sequence of tones for a specific duration, to ascertain continuity and quality of the connection.
2. The MTU can provide a quiet termination for noise measurement.
3. The MTU enables a two-way loss measurement.
4. The MTU can determine the supervisory state (on-hook/off hook) of the loop (i.e., lines 203, 204) on the CPE side of the MTU. After determination of the supervisory state, it can send a unique signal sequence to the technician, indicating an on-hook or off-hook status.
5. The MTU can send a test tone to the CPE to test voice path continuity.
6. The MTU can allow the customer to test for dial tone (for loop start applications) and also to talk to the technician with the help of speakerphone set 250.

The functions of the MTU can be initiated either by the customer upon actuating INIT switch 271, or by the technician calling the customer, and the customer actuating the same switch. Note that the MTU cannot become active simply by remote activation, thereby assuring privacy and security for the customer. After activation, operation of the MTU can be summarized generally as follows: the connection between LEC office 120 and the CPE is "opened" at the MTU, providing a means to isolate trouble conditions to either the line side or to the CPE side of the MTU. "Line Side Testing" and "CPE Side Testing" can then be performed. "Line Side Testing" functions allow the technician to check continuity to and from the MTU, to perform a one-way noise test toward the technician, and a two-way loss measurement. "CPE Side Testing" functions permit the technician to check supervision (On/Off hook) and to perform a transmission test in cooperation with the customer.

Several examples of the use of our invention in connection with commonly occurring telecommunications problems will be instructive. First, if the problem is that the customer, an 800 service subscriber, learns from callers to the customer's 800 number that they are experiencing a ring/no answer condition, or the customer otherwise realized that calls are just not getting through, the customer will contact a technician in test center 150, who then places a test call to the number in question. The customer is asked to actuate INIT switch 271 after the caller detects ringing. If after that switch is actuated, the MTU detects ringing from the LEC, it will answer the call (i.e., go off-hook toward the LEC). If supervision is passed to the technician (caller), it will indicate that there is a problem past the MTU, in the drop or in the CPE. Subsequent commands from the technician could then be initiated, in order to further isolate the problem. On the other hand, if supervision is not passed to the caller, this indicates that the trouble is in the network or on the line side of the MTU.

Second, if the problem is that caller to a customer's number experience a busy condition even when the phone is on hook, a call is again made to the test center. The customer is asked by the technician to actuate INIT switch 271 before the test call is made. This disconnects the CPE from the line at the MTU. When the test call is made, if ringing voltage is present at the MTU, the MTU will answer the call. If ringing voltage is not received, a fault exists in the network or the line. Subsequent commands in the form of 3 digit Touch-Tone patterns from the technician could then be received by the MTU, for further trouble isolation and diagnosis. If the busy condition can be cleared, it indicates that the CPE was causing the errant busy. On the other hand, if the busy condition does not clear, then trouble is on the line side of the MTU.

Figure 3:
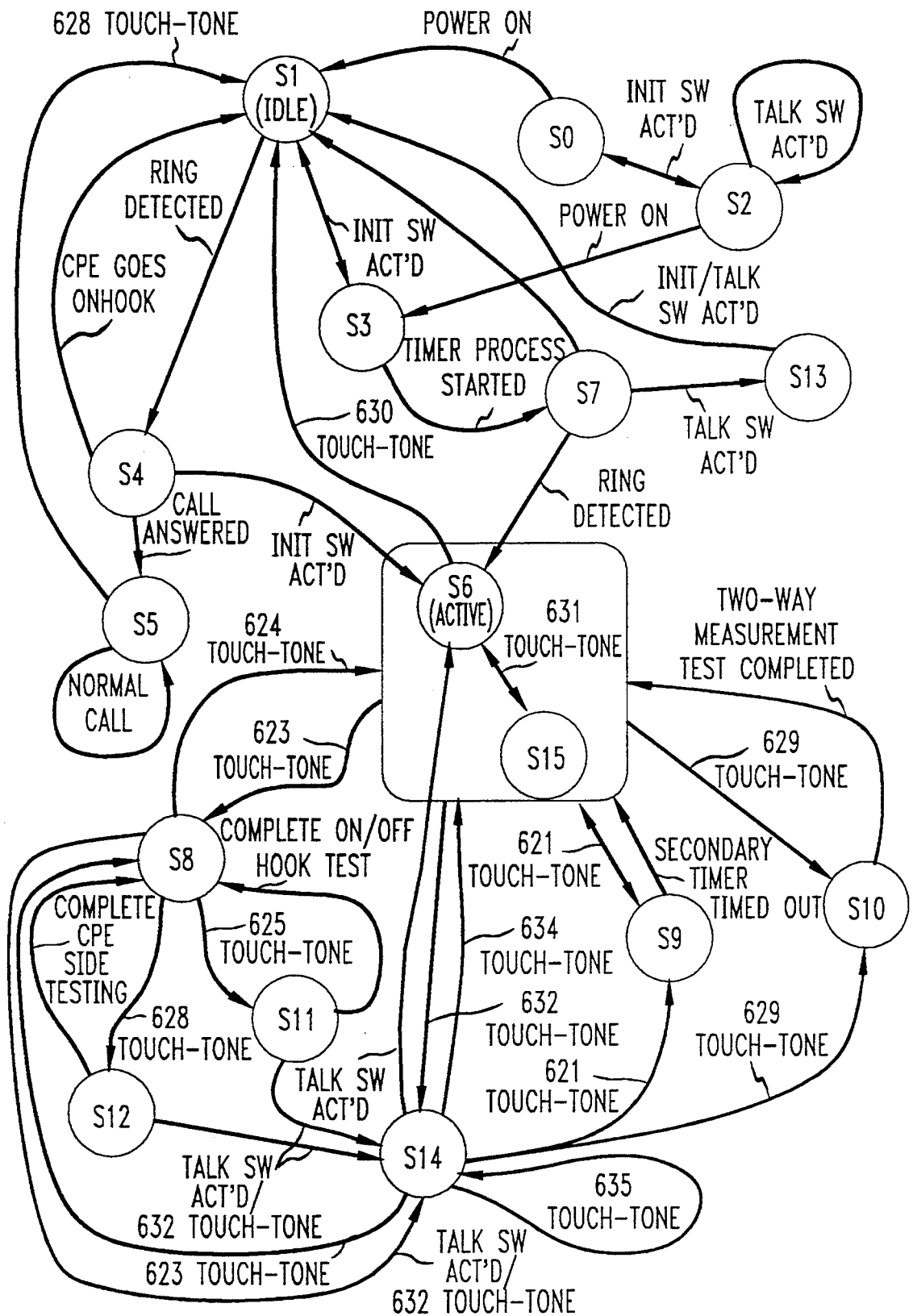
FIG. 3 is a diagram illustrating the relationship between various logical and operational states of the MTU of FIG. 2.

FIG. 3 represents a state transition diagram indicating sixteen logical states, S0–S15, of the various components and elements of the MTU of FIG. 2, that are controlled by processor 210. In state S0, the MTU is "dead/high and dry"; the MTU does not have power connected to it, and the MTU is accordingly inoperative. In this state, termination control circuit 215 is in stage 1, and INIT switch 271 is "enabled" such that actuation by the customer will cause termination control circuit 215 mechanically to transition switches 216 and 217 from stage 1 to stage 2 (this transition constitutes state S2 in FIG. 3). Mechanical transition in switches 216 and 217 is advantageous, because, in state S0, power is not available in processor 210. In state S0, speakerphone set 250 is disabled. State S0 is not the normal idle state for the MTU. Rather, this state only occurs when power is removed from the CPE which can occur, for example, when there is a short on the CPE side or when the CPE has been left off-hook for an extraordinarily long period of time.

Note that, for ground start operation, when the LEC has the circuit in the idle state, it applies −48 v on the Ring lead and the Tip lead is open. Thereby, the MTU will not be in operation until ground is applied to the Tip. When a call is made from the LEC toward the CPE, the LEC applies ground to the Tip and then applies ringing voltage, and the MTU works the same as in a Loop Start circuit.

The MTU transitions from state S0 to state S1 when power to lines 201, 202 is turned on by LEC office 120. This could occur when (after an outage) the LEC detects an on-hook condition on the CPE side. State S1 is the normal idle state for the MTU.

State S3 can be reached from state S1 when INIT switch 271 is actuated, or from state S2 when power is turned on by the LEC. In this state, speakerphone set 250 remains disabled, line voltage detector 241, and ring detector 246, are on and termination control circuit 215 remains in stage 2. Now, processor 210 begins a timing process which continues for a predetermined time interval, and transitions from state S3 to state S7. Termination control circuit 215 remains in stage 2 and TALK switch 272 is enabled.

If ringing voltage is now detected by ring detector 246, the MTU transitions to state S6, which is the "active" state for the MTU. In this state, ring detector 246, tone detector 244, oscillator 243 and tone measurement unit 245 are all enabled, or "on", and the timer mentioned previously is restarted. In state S6, termination control circuit 215 advances to stage 3, thereby "answering" the call, and initiation detector 221 is turned on. Speakerphone set 250 remains enabled, so that, if TALK switch 272 is actuated, the MTU can transition to state S14 and the technician can speak with the customer. Speakerphone set 250 can also be activated when the MTU is in state S6, if the technician sends a predetermined signal sequence (digits 632 for example), also causing a transition to state S14. While in state S14, if TALK switch 272 is actuated, or if a predetermined Touch-Tone sequence (634) is received by the MTU, a transition takes the MTU back to state S6. Before entering state S14, the MTU sends an acknowledgement (Touch-Tone sequence of 632) to ARU 152 or test center 150. Also, while in state S14, ARU 152 sends a Touch-Tone sequence of 635 every 59 seconds (for example) to keep the attached speakerphone set 250 active. Before leaving this state, the MTU sends an acknowledgement, Touch-Tone sequence 634, to ARU 152 or test center 150. In state S6, and all states that can be reached from state S6, INIT switch 271 is disabled, so that its further actuation has no effect on operation of the MTU.

At this point, the technician in test center 150 can determine which tests should be performed in order to isolate the source of the trouble and begin appropriate measures to repair the trouble. The particular tests are initiated when the technician sends a particular signal sequence (e.g., Touch-Tone digits) from testing center 150 to the MTU. The reception of different signal sequences places the MTU in different states, as described below.

When Touch-Tone digits 623 are detected in processor 210, a transition from state S6 to state S8 occurs, in which "CPE side testing" can be performed. In this state, termination control circuit 215 is advanced to stage 5 in which the CPE is attached to the MTU via lines 203, 204 and switches 216, 217. In stage 5, terminating resistor 280 remains across the line as well, so that the call is not dropped with respect to LEC office 120.

In order to check if the CPE is on-hook or off-hook, (or if, alternatively, there is a short or open in lines 203, 204 or in the CPE itself) a Touch-Tone sequence (625, for example) may be sent to the MTU, causing a transition to state S11 in which drop current sensor 260 is active. Drop current sensor 260 makes a determination as to whether line current is flowing from the MTU to the CPE via lines 203, 204, and communicates that determination to the processor 210, which, in turn, sends Touch-Tone sequences 626 or 627 to the technician, indicating on-hook or off-hook conditions, respectively. The MTU is then returned to state S8.

The results obtained thus far are not determinative, because an ambiguous result could arise from the fact that a short circuit in the line could be mistaken for an off-hook condition; also, an open circuit in the line could be interpreted as an on-hook condition. To resolve this ambiguity, a further determination is made with cooperation between the technician and the customer, which cooperation is enabled in accordance with our invention by communication between them via speakerphone set 250. In particular, the technician can now ask the customer to remove the handset from the CPE (if the handset had been previously on-hook), or to replace the handset on the CPE (if the handset had previously been off-hook), at which time the above test is repeated by the technician sending sequence 625 and again transitioning from state S8 to state S11. Now, the ambiguity is resolved: if the customer was on-hook and the MTU recognizes a condition associated with off-hook CPE, it is then certain that a shorted condition exists in the CPE; if the customer was off-hook and the MTU recognizes a condition associated with on-hook CPE, it is then certain that a open condition exists in the CPE.

Another "CPE side test" is performed when the technician transmits another Touch-Tone sequence (628, for example) and the MTU transitions to state S12. In this state, processor 210 sends to the CPE two tones of fixed frequency and signal strength (illustratively a 1004 Hz tone at −6 dBm) with a known time pattern, e.g., successive 5-second on times separated by a 2-second off interval. If the CPE is appropriately equipped, it can itself determine from the received signal strength and quality whether there is an unacceptable loss in the portion of the line between the MTU and the CPE. The MTU returns from state S12 to state S8 upon completion of this test.

During CPE side testing, if the customer wishes to talk to the technician, or the technician wishes to talk to the customer, TALK switch 272 may be actuated, or a Touch-Tone sequence (632, for example) may be entered by the technician, causing a transition from states S12 or S11 (respectively) to state S14.

If the preceding testing is sufficient to diagnose the problem, testing can be terminated when the technician transmits a Touch-Tone sequence (630, for example) which causes the MTU to transition from state S8 back to state S1, the idle state. If further testing is needed, as described below, the technician can enter a different Touch-Tone sequence (624, for example), which returns the MTU to state S6.

Continuity and noise measurements may be made remotely when the technician sends yet another Touch-Tone sequence (621, for example), and the MTU transitions from state S6 to state S9. In this state, a sequence of three tones is generated by oscillator 243 and applied to lines 201,202. Thereafter, "quiet termination" 242 is applied across lines 201,202 for a predetermined time period, which is measured by a counter initiated within processor 210. The three tone sequence is measured in ARU 152 of FIG. 1, which is arranged thereafter to measure line noise with the quiet termination attached. The results of these measurements are made available to the technician for use in the trouble isolation process. This test can be terminated if the technician again enters a Touch-Tone sequence (621, for example), or if the timer in processor 210 completes its timing cycle. In either event, the MTU returns from state S9 to state S6.

If the technician desires to perform a two-way loss measurement, a Touch-Tone sequence (629, for example) is generated causing the MTU to transition to state S10. In response, the MTU returns the same Touch-Tone sequence, indicating that it is ready to begin the measurement procedure. When the latter sequence is received in ARU 152, a tone signal at a known frequency and power level is applied to lines 201,202 for a predetermined duration. This tone signal is received and measured in tone measurement unit 245 so that processor 210 can thereafter generate an output indicative of the measured signal level. This level is converted to a predetermined code, the digits of which are returned to ARU 152 using oscillator 243. The following table is indicative of the procedure followed to generate different digit patterns.

Create the 4 digit pattern in the format "abcd" where:
a=[8 or 9];
  If the measured power minus 3 dB results in a value equaling more
  than 0 dBm, then a="8".
  If the measured power minus 3 dB results in a value equaling 0 dBm or
  less, then a="9".
b=[0-9]representing the tens digit;
c=[0-9]representing the units digit;
d=[0-9]representing the tenths digit.
For example:
Assume the power level measured is 0.0000671 watt, which is equivalent to −11.7 dBm. First, subtract 3 dB resulting in −14.7 dBm, then send a Touch-Tone pattern of "9147".

In addition, the MTU generates, using oscillator 243, its own signal of known frequency and signal strength and applies it to lines 201,202 for a predetermined duration. This signal can, in turn, be measured by ARU 152 and the results communicated to the technician. After the MTU has transmitted the last mentioned signal to ARU 152, it returns from state S10 to state S6. Using the previously described test procedure, the technician can determine the two-way loss in lines 201, 202.

Under some circumstances, such as when noise testing is being performed, it may be desirable for the technician to disable TALK switch 272. In this event, a Touch-Tone sequence (631, for example) may be sent, causing a transition from state S6 to state S15. TALK switch 272 can thereafter be enabled by reapplication of the same sequence, causing a transition from state S15 to state S6. Note that in state S15, TALK switch 272 is inoperative such that speakerphone set 250 cannot be activated regardless of the actuation of this switch. However, a Touch-Tone sequence of 632/634 may be used by the technician to attach/detach speakerphone set 250 to establish communication between the technician and the customer. (This causes a transition from state S15 to state S14, or vice-versa). Also note that all of the tests previously described with respect to states S8, S9, and S10 can also be performed by transitions from state S15 as well as transitions from state S6.

State S13, shown in FIG. 3, is provided for use at the beginning of the testing process when the customer desires to perform a preliminary test to isolate a trouble by determining if dial tone is available (for loop start applications only) and can be heard through speakerphone set 250 in the MTU. This state is reached from the idle (S1) state when the customer actuates INIT switch 271 to transition to state S3, a timing process is started, transitioning to state S7, and the TALK switch 272 is thereafter actuated. In state S13, if voltage is present on lines 201,202, and LEC office 120 recognizes the off-hook condition and responds accordingly by applying dial tone to the line, and if the line is operating properly, the customer will hear dial tone through the speakerphone set 250. The MTU is returned from state S13 to state S1 when INIT switch 271 or TALK switch 272 is again actuated, or when a predetermined time period (1 minute, for example) has elapsed.

In order to preserve the privacy of normal calls connected to the CPE (e.g., telephone 103) and assure that the MTU is truly transparent to such calls, states S4 and S5 are provided. More specifically, the MTU transitions from state S1 to state S4 when ringing voltage is detected and from state S4 to state S5 when the call is answered by the CPE, as detected by drop current sensor 260. In state S5, both INIT switch 271 and TALK switch 272 are disabled, so that speakerphone set 250 cannot be used, and all other functions of the MTU cannot be energized. The MTU returns from state S5 to state S1 only when the CPE returns to its on-hook condition. Note, however, that when the MTU is in state S4, if INIT switch 271 is actuated, the customer desires to begin testing. Accordingly, the MTU transitions from state S4 to state S6, rather than to state S5.

Although not shown explicitly in FIG. 3, all of the states (other than states S0 and S2, at which no power is available at the MTU, and states S4 and S5 during which a normal call is being answered) are provided with the capability of returning to idle state S1 when a predetermined time interval (1 minute, for example) has expired, and no activity (such as receipt of Touch-Tone sequences or actuation of TALK switch 272) has occurred. This capability assures that communication is not disrupted for an unduly long period of time in the event that a switch on the MTU is accidentally depressed.

While the state diagram of FIG. 3 explains the operation of the MTU of FIG. 2 and the functionality that can be provided thereby, the control logic in processor 210 that performs and controls the state transitions described in FIG. 3 can be viewed in terms of logic flow diagrams, as shown in FIGS. 4-8. After the process begins in step 400, a determination is made in step 401 as to whether or not line voltage is present on lines 201,202. If no line voltage is present, a determination is made in step 419 as to whether INIT switch 271 has been actuated. If the switch has not been actuated, the MTU is not activated, and the process repeats step 401.

If, in step 401, line voltage is present, then the MTU proceeds to step 402, the idle state. In the idle state, a determination is made (step 411) as to whether INIT switch 271 is actuated. If so, termination control circuit 215 steps switches 216,217 into stage 2 (step 412). At this point, a timer is started (step 414) to monitor the threshold time (1 minute, for example). In step 415, a check is made to see if TALK switch 272 is actuated. If so, termination control circuit 215 steps switches 216,217 into stage 4 in step 424, where speakerphone set 250 is active. Now a check for dial tone in step 425 determines on which side of the MTU the problem is present, if any. If there is a problem and a dial tone is heard in step 425, then the problem is on CPE side; if not, it is on line side (step 426). After test step 425, if either INIT switch 271 or TALK switch 272 is actuated, or if one minute threshold time is reached, the MTU returns to idle state, step 402.

If in step 415, TALK switch 272 is not actuated, then the MTU repeats step 416 until either actuation of INIT switch 271, detection of ringing voltage, or attainment of the threshold value in the timer process of step 414. If switch 271 is actuated or 1 minute has elapsed, but if in step 416 ringing voltage is not detected, then the MTU goes into its idle state, step 402. On the other hand, if ringing voltage is detected in step 417 after one of the conditions in step 416 occurs, the MTU goes to its active state in step 418.

Figure 4:
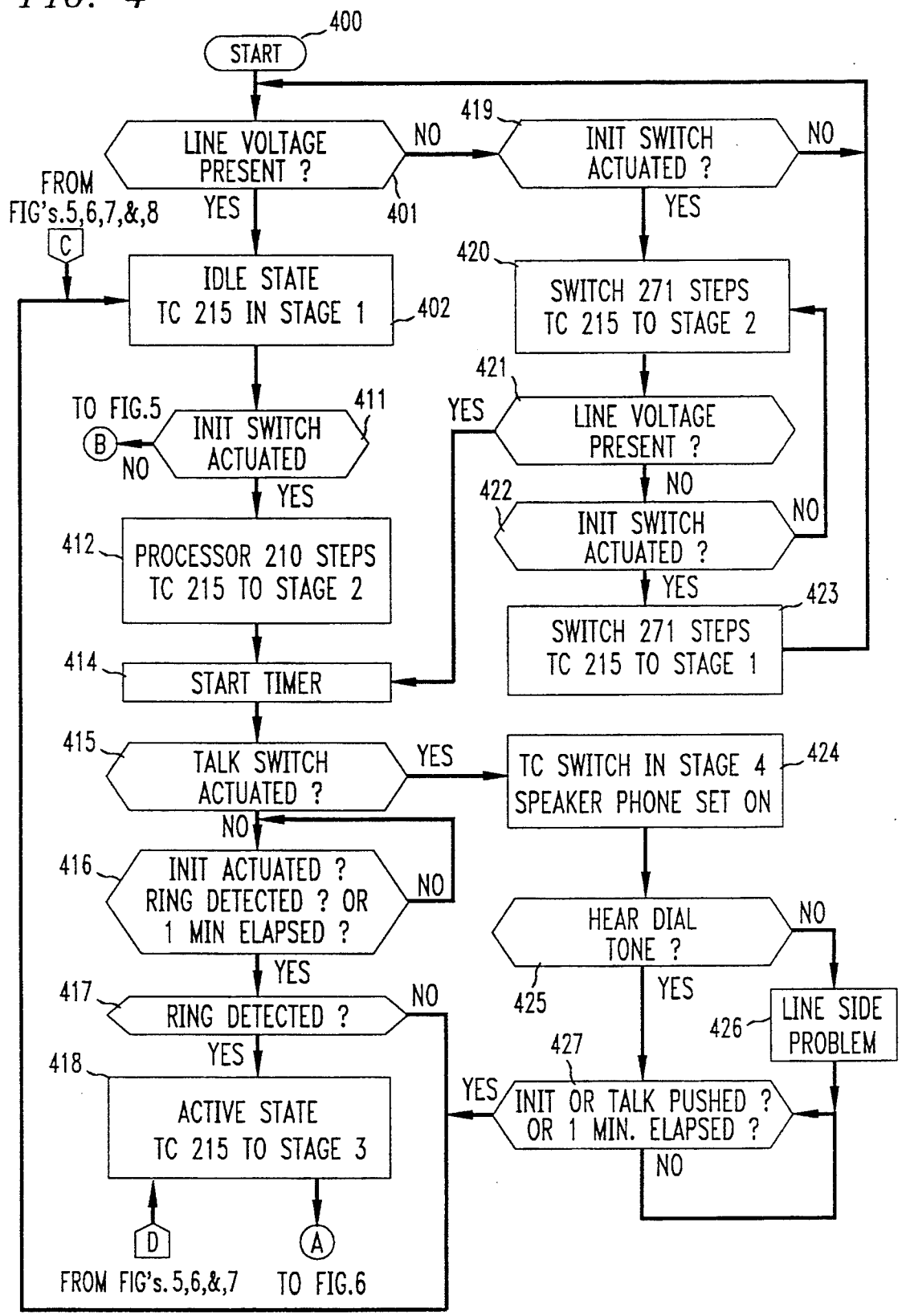
FIGS. 4–8 are logic flow diagrams illustrating the steps followed during operation of the MTU of FIG. 2.
Figure 5:
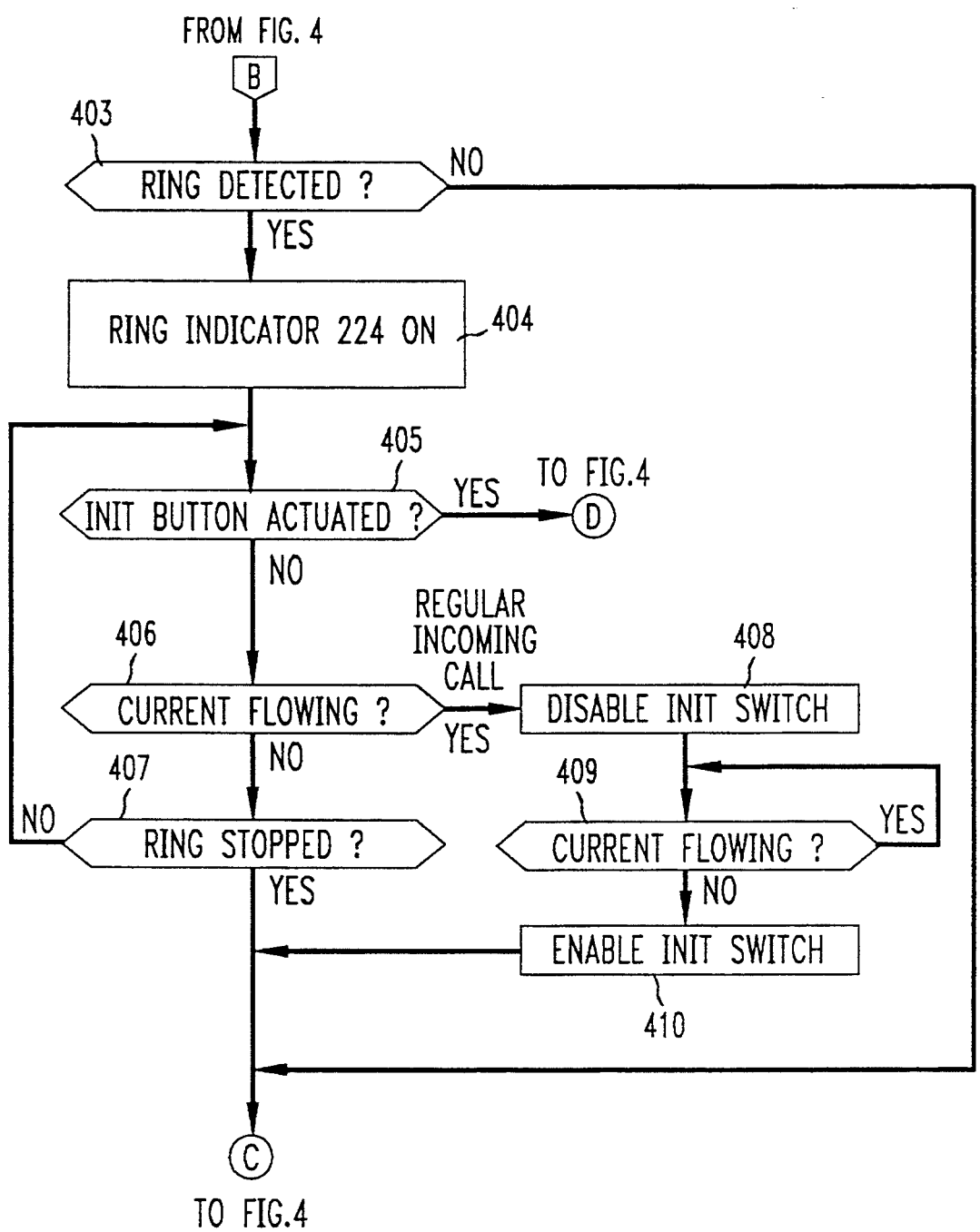

In FIGS. 4 and 5, note that the idle state (step 402) is arranged so that if INIT switch 271 is not actuated (step 411) and if ringing voltage is not detected in step 403, then the MTU remains in its idle state. If ringing voltage is detected in step 403, the ring indicator in display 220 will flash at the ring rate in step 404.

If, while ringing voltage is being detected step 404, INIT switch 271 is actuated in step 405, the MTU goes into its active state in step 418. If INIT switch 271 is not actuated in step 405, a determination is made in step 406 by drop current sensor 260 as to whether loop current is being drawn, indicating answer by the CPE. If loop current is being drawn, then the call has been answered (a regular call) and the MTU does not become active, because INIT switch 271 is disabled in step 408. Loop current is continuously monitored in step 409. When loop current stops, indicating that the CPE has gone on-hook, the call is ended and the MTU then goes to its idle state in step 402. However, in step 410, INIT switch 271 is again enabled.

If, in step 406, loop current is not detected, and ringing did not stop in step 407, the MTU proceeds to step 405, to check if INIT switch 271 is actuated. On the other hand, if ringing is stopped in step 407, the MTU steps to its idle state, step 402.

If, in step 419, INIT switch 271 is actuated, termination control circuit 215 causes switches 216-217 to move to stage 2 through mechanical application in step 420. If, subsequently, line voltage is detected in step 421, the process continues with step 414, where a timer process is started. On the other hand, if, subsequently, INIT switch 271 is actuated in step 422, switches 216-217 move to stage 1 in step 423. After this, the MTU proceeds to step 401. If line voltage is not detected in step 421 and INIT switch 271 is not actuated, the MTU continues to stay in stage 2. This corresponds to state S2 in FIG. 3.

Figure 6:
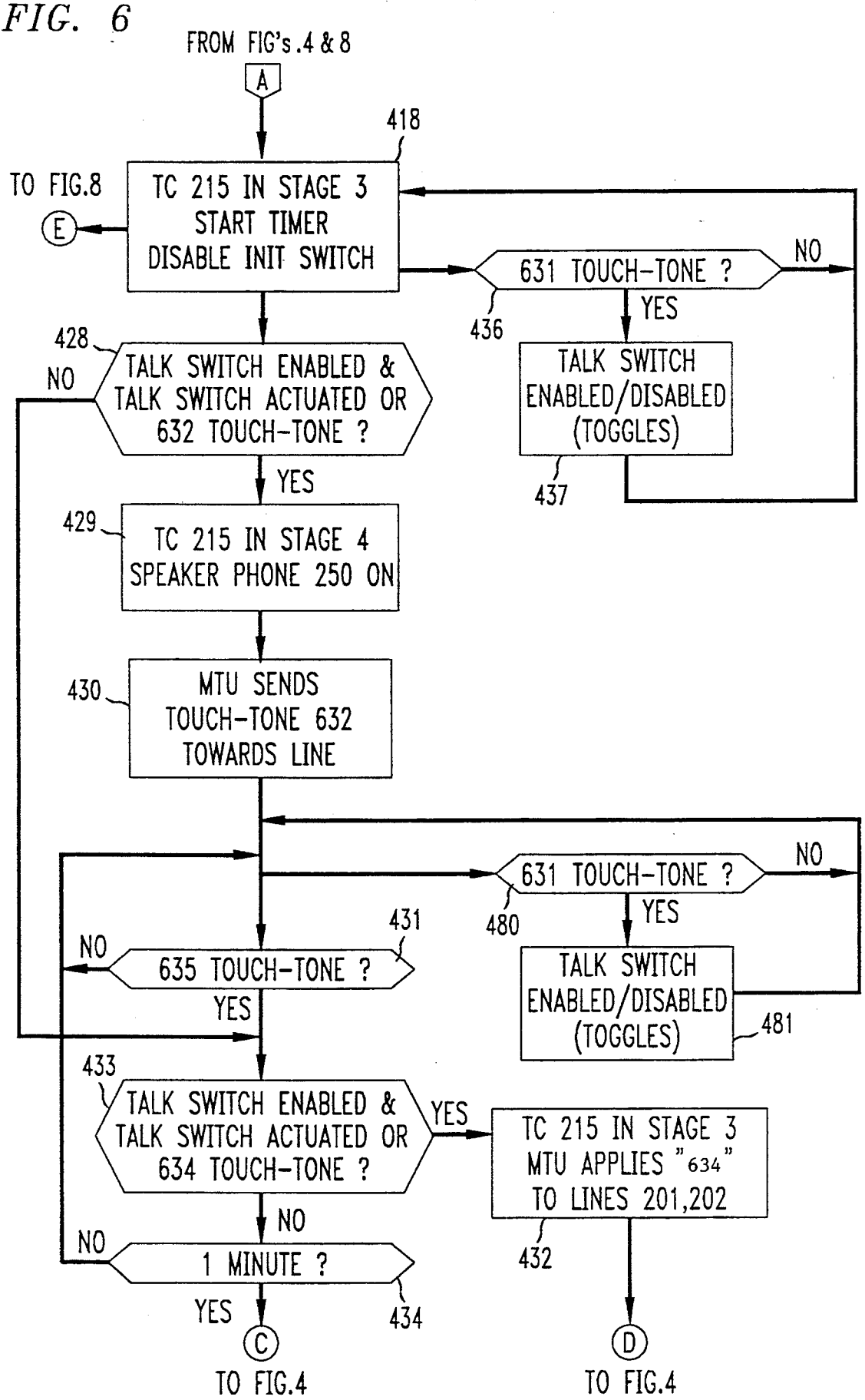

While in the active state in step 418, various tests can be performed remotely by the technician sending predetermined signal sequences (e.g., Touch-Tones) to the MTU. The tests, which are principally illustrated in FIGS. 6–8, are as follows:

(1) if Touch-Tone sequence 621 is received in step 440, the MTU moves to step 490 (see FIG. 8), wherein it remembers the current state of TC switch 215 and the position (mode) of TALK switch 272. Then, in step 445, it disables TALK switch 272 and speakerphone set 250 and sends three tones (illustratively, 404 Hz, 1004 Hz, and 2804 Hz) toward the line then applies quiet termination (step 446) for 30 seconds or until Touch-Tone sequence 621 is received in step 448 (whichever occurs first). Then, in step 491, the MTU resumes the previous state of TC switch 215 and mode of TALK switch 272, both as remembered in step 490. Then the MTU returns to its active state in step 418.

Figure 7:
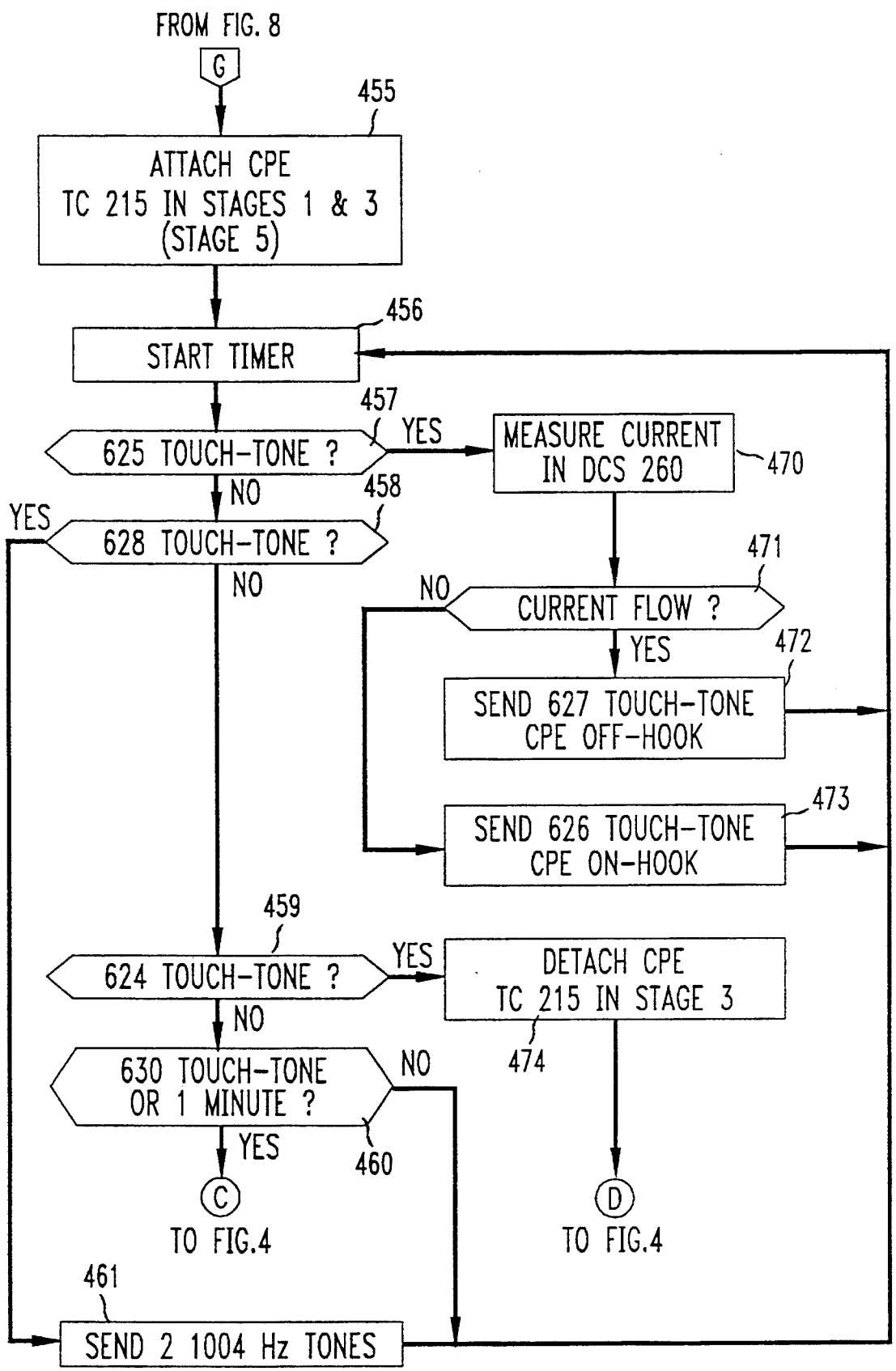
Figure 8:
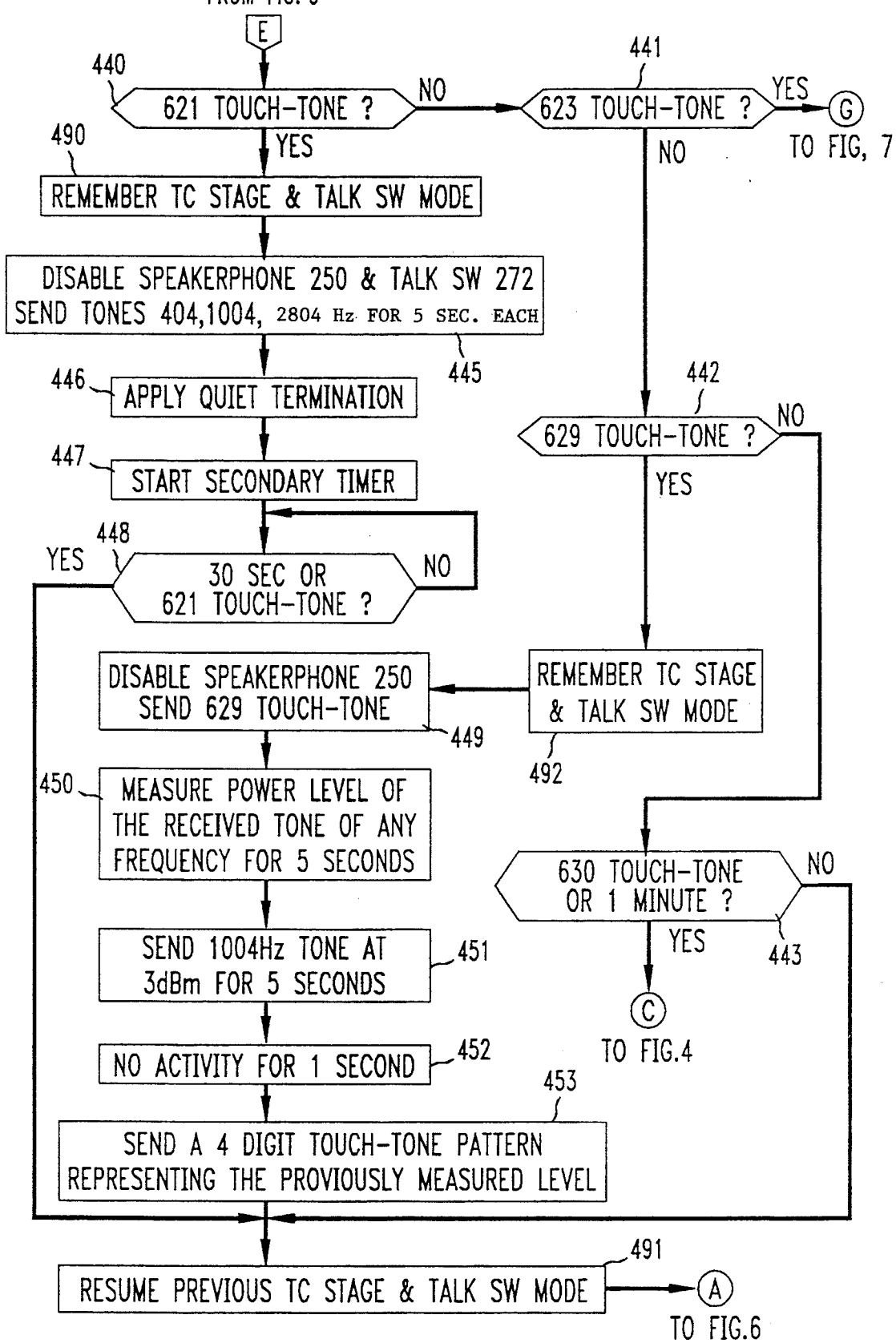

(2) If Touch-Tone sequence 623 is received (step 441), the CPE is attached when termination control circuit 215 repositions switches 216–217 to stage 5 (step 455, see FIG. 7). A timer is then started in step 456.

(2.1) If Touch-Tone sequence 625 is detected in step 457, drop current sensor 260 measures loop current in step 470. If loop current is detected in step 471 (drop or CPE is off-hook), the MTU sends Touch-Tone sequence 627 in step 472. If loop current is not detected in step 471 (CPE is on-hook), the MTU sends Touch-Tone sequence 626 in step 473.

(2.2) If Touch-Tone sequence 628 is detected in step 458, the MTU sends two 1004 Hz tones to the CPE in step 461.

(2.3) If Touch-Tone sequence 624 is detected in step 459, the CPE is detached in step 474, when termination control circuit 215 causes switches 216,217 to move to stage 3. Upon completion of step 474, the MTU is returned to its active state, step 418.

Although steps 457,458,459 and 460 are illustrated in FIG. 4 as being sequential steps in which different Touch-Tone patterns are detected, persons skilled in the art will appreciate that these steps can in fact occur in any order and be detected by a processor which is sensitive to the receipt of individual Touch-Tone patterns. The same is true with respect to steps 440,441,442, and 443, and steps 428 and 436.

Referring to FIGS. 7 and 8, if Touch-Tone sequence 630 is detected in steps 460 and 443, or the threshold time expires, the MTU is returned to its idle state, step 402.

(3) If Touch-Tone sequence 629 is received in step 442, the MTU remembers the current state of TC switch 215 and the position (mode) of TALK switch 272 in step 492. Then, speakerphone set 250 and TALK switch 272 are disabled and a predetermined Touch-Tone sequence (629, for example) is sent by the MTU to ARU 152 of FIG. 1, all in step 449. During a subsequent preset interval (5 seconds, for example) the MTU now measures (in step 450) the power level of the tone received via lines 201,202. In step 451, the MTU returns via the same lines, a tone (1004 Hz, for example) at a preselected power level (−3 dBm, for example). This tone continues for a predetermined time interval (5 seconds, for example) after which a silent interval (1 second, for example) occurs in step 452. At this point, in step 453, the MTU transmits to the technician information indicative of the power level measured in step 450. As indicated previously, this information can be represented in the form of a 4-digit Touch-Tone pattern. Next, in step 491, the MTU resumes the previous state of TC switch 215 and mode of TALK switch 272, both as remembered in step 492. The MTU then returns to active state 418.

Referring to FIG. 6, if Touch-Tone sequence 631 is detected in step 436, the control exercised by TALK switch 272 is changed in the following manner: if TALK switch 272 was previously enabled such that speakerphone set 250 was active or could have been activated by use of TALK switch 272, the switch is now disabled such that speakerphone set 250 can no longer be activated locally by the customer. On the other hand, if TALK switch 272 had previously been disabled, it is now enabled such that actuation of TALK switch 272 will produce activation of speakerphone set 250. Upon completion of step 437, the MTU returns to active state in step 418.

If it is determined in step 428 that TALK switch 272 is both enabled and actuated, or if a predetermined Touch-Tone sequence (632, for example) is received, the MTU proceeds in step 429 to cause termination control circuit 215 to position switches 216,217 to stage 4, in which speakerphone set 250 is active. This activation is signaled to test center 150 in step 430, when a predetermined Touch-Tone sequence (632, for example) is transmitted via lines 201,202. After step 430, if Touch-Tone sequence 631 is received in step 480, TALK switch 272 is enabled/disabled (toggled) in step 481. Then, after a 1-minute interval has elapsed (step 434), if a Touch-Tone sequence of 635 is not received in step 431, the MTU then returns to its idle state 402. If TALK switch 272 is again actuated by the customer in step 433, or if a predetermined Touch-Tone sequence (634, for example) is received via lines 201,202 (step 433) speakerphone set 250 is disabled in step 432 in which termination control circuit 215 causes switches 216,217 to return to stage 3. At this point, the MTU returns to its active state, step 418.

The following table summarizes the actions taken in the MTU of during the process of FIGS. 4-8, when different Touch-Tone sequences are detected.

| Signal Sequence | Description of the Function |
| --- | --- |
| 621 | Upon detection of this sequence for the first time, the MTU starts sending tones back (404Hz, 1004Hz, 2804Hz). If the MTU detects this sequence during Quiet Termination (QT), it ends the QT and goes back to active state (S6 or S15). |
| 623 | MTU attaches the CPE to the line while holding the line. |
| 624 | MTU detaches the CPE from the line while holding the line. |
| 625 | MTU measures the current flowing in DSC260. |
| 626 | MTU sends this sequence toward the line side if CPE is on hook. |
| 627 | The MTU sends this sequence toward the line side if CPE is off hook. |
| 628 | MTU sends two 1004Hz tones at −6dBm in sequence (with 5 seconds interval) for 10 seconds toward the CPE. |
| 629 | MTU sends a "629" sequence toward the line indicating that it is ready to measure the power level. |
| 630 | MTU is deactivated. |
| 631 | TALK switch (272) is enabled/disabled (toggle). |
| 632 | MTU activates speakerphone set (250). |
| 634 | MTU deactivates speakerphone set (250). |
| 635 | When a conversation is in progress between the technician and a user of the MTU, this sequence every 59 seconds prevents time out. |

Certain design characteristics are desirable in the MTU. When the MTU is in its idle state, the dc tip to ring resistance should be greater than 5 Megohms, and the dc tip/ring to ground resistance should also be greater than 5 Megohms. When the MTU is active, the impedance of the MTU should be 600 ohms on the line side, and 600 ohms on the CPE side at 0-4000 Hz. The MTU should not draw current sufficient to produce a dial tone (not be off hook), when it is in its idle state.

The return loss from speakerphone set 250 at any single frequency up to 3400 Hz should be greater than 40 dB in the idle state and should be greater than 14 dB when the MTU is providing termination. The insertion loss at 1004 Hz for the MTU should be less than or equal to 0.1 dB when it is in idle state.

The MTU must be a passive device when it is in idle state (or when there is a logic failure), so that it can provide transparent transmission path between the network and the customer's terminal equipment. The MTU must be initiated by operating the INIT switch 271 only. After initiation, if ringing voltage is detected (or after ringing voltage is detected, the INIT switch 271 is actuated), the MTU answers the call and is fully activated to perform the tests. The power level of Touch-Tone sequences transmitted from the MTU, should be −7 dBm±0.1 dB.

The MTU should be capable of detecting Touch-Tones between +6 dBm and −30 dBm level, and generating 404Hz, 1004 Hz, and 2804 Hz tones with an accuracy of ±1 Hz, with a level of−3 dBm ±0.1 dB across 600 ohms.

The MTU should be able to measure tones ranging from ±6 dBm to −30 dBm with an accuracy of ±0.1 dB. All harmonics should be 40 dBm below the fundamental frequency. The frequency response should be ±0.5 dB from 300 Hz to 3500 Hz.

Various modifications and adaptations may be made to the present invention by those skilled in the art. For this reason, it is intended that the invention be limited only by the appended claims.

What is claimed is:

1. Telecommunications testing apparatus for use in testing a communications line connecting Customer Premises Equipment (CPE) to a telecommunications network, said telecommunications testing apparatus comprising means for establishing a voice communication path between a customer using said telecommunications testing apparatus and a technician remotely performing tests on said telecommunications network and said CPE, said path including said communications line, and means enabling said customer and said technician to cooperatively perform a series of tests on said communications line using information provided via said voice communication path, said tests being arranged to isolate troubles as being in either said telecommunications network or said CPE.

2. The invention defined in claim 1 wherein said last mentioned means includes means for opening the connection between said telecommunications network and said CPE.

3. The invention defined in claim 1 wherein said last mentioned means includes a microprocessor arranged to perform a plurality of measurements in response to remotely generated signal sequences received from said technician.

4. The invention defined in claim 2 wherein said tests are selected from the group consisting of: continuity, noise measurement, two-way loss measurement, and CPE supervision and tranmission tests.

5. The invention defined in claim 2 wherein said tests include line side tests which test the performance of said communications line and CPE side tests which test the performance of said CPE.

6. The invention defined in claim 1 wherein said telecommunications testing apparatus further includes means for initiating said initiating of tests, said means being actuatable only locally by a user of said apparatus.

7. The invention defined in claim 1 wherein said telecommunications testing apparatus includes a visual display indicating the results of the tests and the status of said apparatus.

8. The invention defined in claim 1 wherein said telecommunications testing apparatus includes an oscillator arranged to generate a test signal of known frequency and signal strength.

9. The invention defined in claim 8 wherein said telecommunicating testing apparatus further includes a tone detector arranged to recognize the presence of signals having a preselected frequency.

10. The invention defined in claim 3 wherein said signal sequences are sequences of Touch-Tone digits.

11. Telecommunications testing apparatus for use near the demarcation point between a telecommunications network and Customer Premises Equipment (CPE) connected to said telecommunications network, said apparatus comprising means responsive to receipt of Touch-Tone sequences generated in a remote test center for performing a series of performance measurements on said CPE and said network, wherein for at least some of said measurements, said apparatus is arranged to isolate said CPE from said network, and means for establishing audio communication between a user of said testing apparatus and said remote testing center, whereby ones of said performance measurements can be performed cooperatively by a person in said test center and said user.

12. A Maintenance Termination Unit (MTU) arranged to perform tests on Customer Premises Equipment (CPE) connected to a telecommunications network to isolate problems as being in said CPE or in said network, said MTU including a microprocessor arranged to perform a sequence of tests under the control of a technician, means in said MTU operable to isolate said CPE from said network, and means in said MTU for establishing two way audio communication between said technician and a user of said MTU during performance of at least a portion of said test sequence.

13. Apparatus for performing remote testing on Customer Premises Equipment (CPE) connected to a telecommunications network, said apparatus being connected near the point of demarcation between said network and said apparatus, said apparatus comprising a processor for controlling the performance of a test sequence, a plurality of switches actuatable by a user to control said processor, and a speakerphone allowing audio communication with said user during said testing, wherein said apparatus is arranged to derive operating power for said processor and said speakerphone from said telecommunications network.

14. A method for testing a telecommunications system including a telecommunications network and Customer Premises Equipment (CPE) connected to said telecommunications network, said method comprising the steps of isolating said CPE from said network and performing a series of performance measurements on said CPE and said network, both in response to receipt via a communications path of Touch-Tone sequences generated in a remote test center, and establishing audio communication via said communications path between a user of said testing apparatus and said remote testing center, whereby ones of said performance measurements are performed cooperatively by a person in said test center and said user.

15. A method of testing a communications line connecting Customer Premises Equipment (CPE) to a telecommunications network, said method comprising the steps of installing test apparatus in said communications line near the demarcation point between said network and said CPE;

establishing a voice communication path in said communications line between a customer using said test apparatus and a technician remotely performing tests on said telecommunications network and said CPE; and performing a series of tests by cooperation between said customer and said technician using information provided via said voice communication path, at least one of said tests including the step of activating said test apparatus to isolate troubles to either said telecommunications network or said CPE.

16. The method defined in claim 15 wherein said last mentioned step includes opening the connection between said telecommunications network and said CPE.

17. The method defined in claim 15 wherein said last mentioned step includes performing, under microprocessor control, a plurality of measurements in response to remotely generated signal sequences received from said technician.

18. The method defined in claim 16 wherein said tests are selected from the group consisting of: continuity, noise measurement, two-way loss measurement and CPE supervision and transmission tests.

19. The method defined in claim 16 wherein said tests include line side tests which test the performance of said communications line and CPE side tests which test the performance of said CPE.

20. The method defined in claim 15 wherein said method includes the step of initiating said series of tests only upon local actuation of initiating means in said test apparatus.

21. The method defined in claim 15 wherein said method further includes indicating the results of the tests and the status of said test apparatus on a visual display.

22. The method defined in claim 15 wherein said method further includes generating test signals using an oscillator.

23. The method defined in claim 22 wherein said method further includes detecting supervision of said CPE using a drop current sensor.

24. The method defined in claim 17 wherein said signal sequences are sequences of Touch-Tone digits.

25. A method for testing a telecommunications system including a telecommunications network and Customer Premises Equipment (CPE) connected to said telecommunications network, said method comprising the steps of receiving Touch-Tone sequences generated in a remote test center;

responsive to said Touch-Tone sequences, performing a series of performance measurements on said CPE and said network, at least some of said measurements including isolating said CPE from said network; and establishing audio communication between a user of said testing apparatus and said remote testing center, whereby ones of said performance measurements are performed cooperatively by a person in said test center and said user.

26. Telecommunications testing apparatus for use near the demarcation point between a telecommunications network and Customer Premises Equipment (CPE) connected to said telecommunications network, said apparatus comprising means operative to isolate said CPE from said network only in response to local actuation by a user of said testing apparatus, means responsive to receipt of Touch-Tone sequences generated in a remote test center for performing a series of performance measurements on said CPE and said network, and means for deriving power to operate said testing apparatus from said telecommunications network.

* * * * *